INVENTOR
HAROLD G. DAVIS
THAYER R. BRUNSON
BY Sheridan and Ross
ATTORNEYS

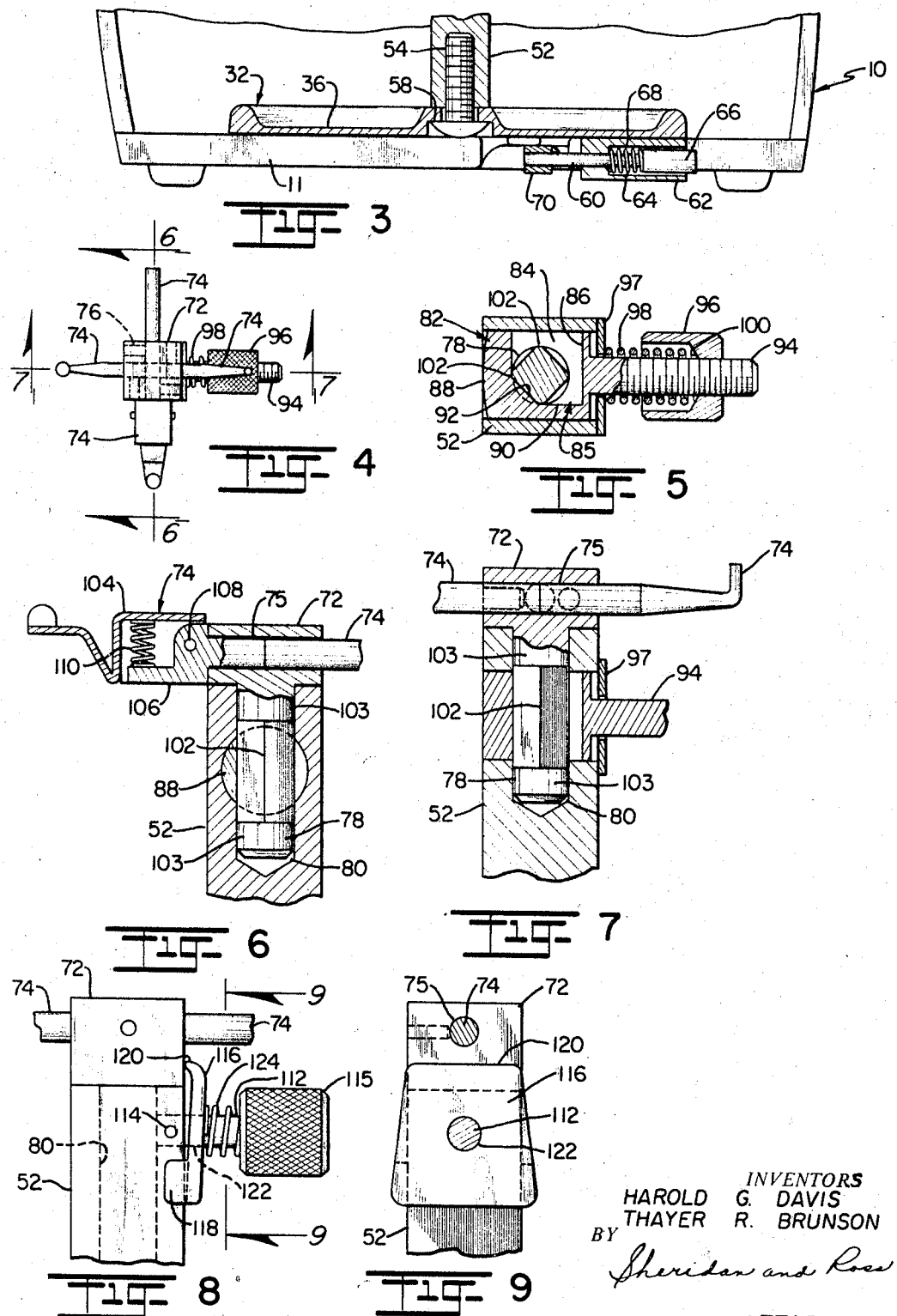

United States Patent Office 3,452,177
Patented June 24, 1969

3,452,177
WELDING DEVICE
Harold G. Davis, Denver, and Thayer R. Brunson, Wheatridge, Colo., assignors to Rocky Mountain Dental Products Co., Denver, Colo., a corporation of Colorado
Filed Oct. 28, 1966, Ser. No. 590,294
Int. Cl. B23k 11/10
U.S. Cl. 219—78                    15 Claims

ABSTRACT OF THE DISCLOSURE

A welding machine comprising a case or support means supporting two turret posts at an angle to each other with one of the turret posts being resiliently supported on a spring-biased treadle. The turret posts carry rotatable electrode turrets on their ends with the turrets adapted to rotate in a plane substantially perpendicular to the turret posts so that rotation of the respective electrode turrets brings into welding alignment the electrodes of cooperating pairs of electrodes. The electrode turrets are mounted in the turret posts by means of turret studs extending axially into the turret posts. The electrode studs are of rectangular cross section and they cooperate with a camming device mounted in the stud to provide definite indexed positions for the electrode stud and, correspondingly, the electrode turret. Biasing means are provided for positively biasing the turret studs into definite posisions and to provide for seating the studs in these positions by snap action. The spring-biased treadle supporting one of the turret posts insures that cooperating electrodes are in resilient contact with each other during welding.

---

This invention relates to a welding machine, more particularly, it relates to a welding machine of the type having rotatable electrode carriers which automatically index and lock in predetermined positions.

The welding device of the invention has application for welding orthodontic equipment; however, it is not limited to this application as it may be used for welding other types of equipment.

In performing welding operations on miniature equipment, such as orthodontic equipment, rapid and accurate alignment of cooperating electrodes in welding position is essential. It is extremely difficult for the operator of the welding device to align the workpieces to be welded together and at the same time bring the cooperating electrodes of the welding device into proper alignment or welding position with respect to the workpieces quickly. Holding the workpieces in welding position occupies both hands of the operator so that no hand is free to adjust the electrodes. Further, if no means is provided for positively positioning the electrodes in position, it is difficult to locate them in the proper position and maintain them there during the welding operation, even though spot welding is involved.

Accordingly, it is an object of this invention to provide a spot welding machine in which the mating electrodes can be readily and accurately positioned in welding position with respect to the work.

It is another object of this invention to provide a welding machine in which the electrodes have defined positions and are moved into these positions by snap action.

It is a further object of this invention to provide an efficient spot welding machine with rotatable electrode carriers and in which electrodes of corresponding pairs are brought into resilient contact with each other.

The welding machine of the invention comprises a case or support means supporting two turret posts at an angle to each other with one of the turret posts being resiliently supported on a spring-biased treadle. The turret posts carry rotatable electrode turrets on their ends with the turrets adapted to rotate in a plane substantially perpendicular to the turret posts so that rotation of the respective electrode turrets brings into welding alignment the electrodes of cooperating pairs of electrodes. The electrode turrets are mounted in the turret posts by means of turret studs extending axially into the turret posts. The electrode studs are of rectangular cross section and they cooperate with a camming device mounted in the stud to provide definite indexed positions for the electrode stud and correspondingly the electrode turret. Biasing means are provided for positively biasing the turret studs into definite posisions and to provide for seating the studs in these positions by snap action. The spring-biased treadle supporting one of the turret posts insures that cooperating electrodes are in resilient contact with each other during welding.

The invention will now be described with reference to the accompanying drawings wherein like parts are represented by like numerals, and in which:

FIG. 3 is a fragmentary section partially in cross section of a bottom area of the welding machine;

FIG. 4 is a top plan view of the lower electrode turret mounted on its turret post;

FIG. 5 is a horizontal cross section taken through the lower turret post on the lines 5—5 of FIG. 2;

FIG. 6 is a section taken on the lines 6—6 of FIG. 4 looking in the direction of the arrows;

FIG. 7 is a fragmentary section taken on the line 7—7 of FIG. 4;

FIG. 8 is a side elevational view of a fragmentary section of a turret post showing a modification of the invention; and FIG. 9 is a front view of the fragmentary section of FIG. 8.

Figure 1:
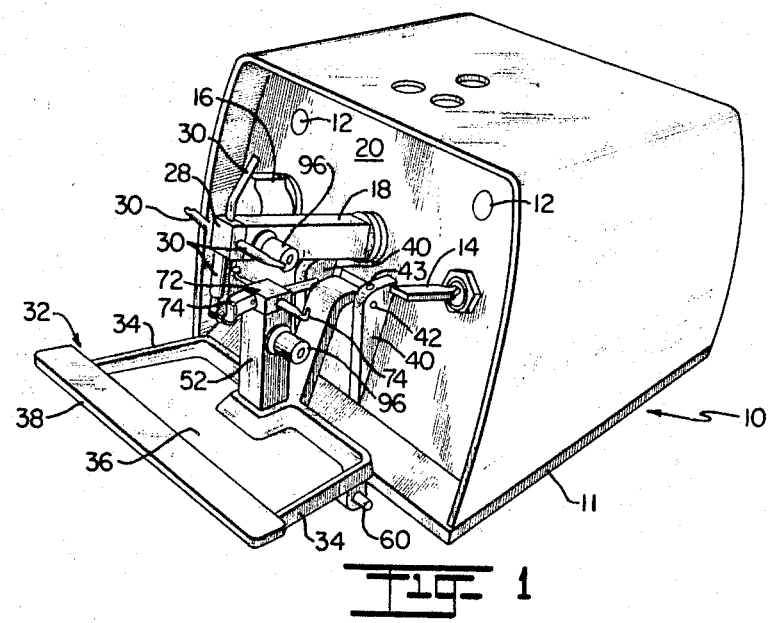
FIG. 1 is a perspective view of the welding machine of the invention.
Figure 2:
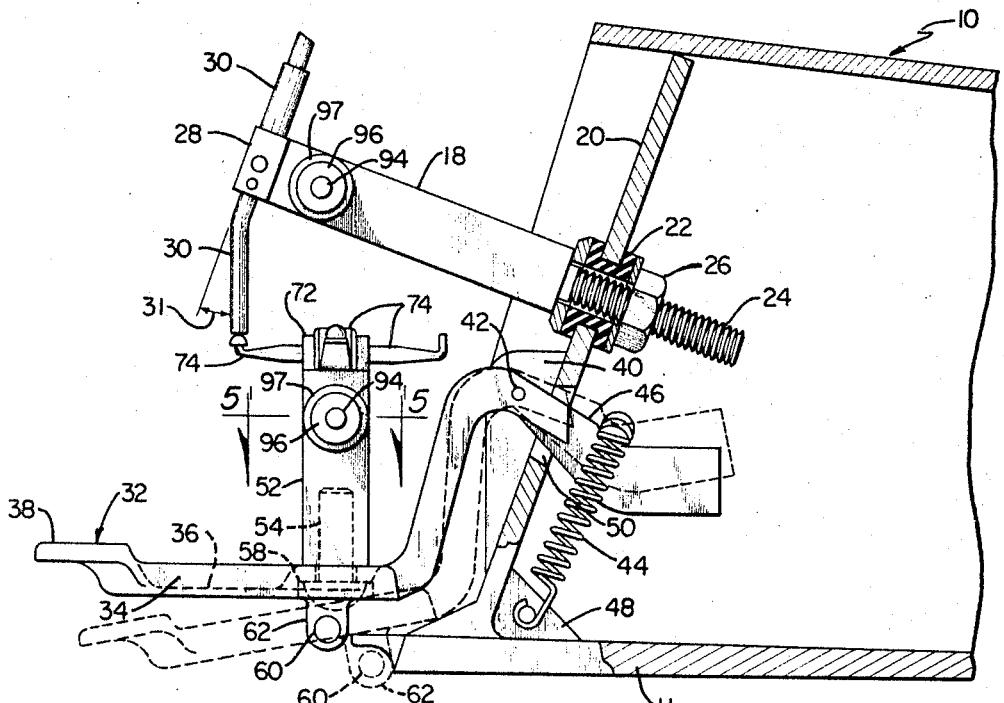
FIG. 2 is a partial side elevational view of the welding machine of the invention showing an alternate position of the treadle in dotted lines.

Referring now to FIGS. 1 and 2, the outer case of the welding machine is represented by the numeral 10 and is constructed of plastic, metal or other durable material. As shown in FIG. 2, the front wall 20 of the case 10 is mounted to slope backwards at a substantial angle to the base 11, for a purpose to be described later. The housing or case 10 houses the electric circuitry for the operation of the welding device. As this circuitry is conventional, it is not illustrated or described. Switches 14 and 16 are mounted in the front wall of the case 10 for controlling the operations of the welding mechanism.

Upper turret post 18 is mounted on the front wall 20 of case 10 at substantially a right angle to the face of the front wall 20 by means of insulating seating grommet 22, threaded post stud 24 and nut 26. The upper turret post 18 supports the upper turret 28 in a plane substantially perpendicular to that of the turret post. The upper turret 28 carries electrodes 30 and is rotatably mounted in turret post 18 to defined indexed positions as will be explained later. For a purpose which will be described later, electrodes 30 are constructed with an angle 31 and mounted so that the contact end of the electrode extends rearwardly as shown. The angle 31 is approximately equal to the angle between the front wall 20 and the base 11. The four electrodes of the upper turret 28 are represented by the numeral 30 although they are of slightly different construction.

A treadle 32 comprised of frame 34, treadle tray 36, hand rail 38 and treadle rocker arm 46 is mounted in case 10 by means of trunnions 40 and adjustable threaded trunnion pin 42. Trunnion pin 42 extends into a mating transverse channel in treadle rocker arm 46. The trunnion pin 42 has a tapered inner end to permit secure contact with and anchoring of rocker arm 46. For locking trunnion pin 42 in position, a set screw 43 extends downwardly into the runnion 40 which supports the trunnion pin. For biasing the treadle upwardly, a biasing spring 44 extends between the interior end of the treadle rocker arm 46 and mounting plate 48. The rocker arm 46 passes through opening 50 in the front wall 20 of case 10.

Lower turret post 52 is seated on a raised boss on treadle tray 36 and is supported in a vertical position by threaded bolt 54 which is threadably attached to an interior threaded channel of post 52 with its head seated in seat 58 in the bottom of treadle tray 36. By this arrangement, lower turret post 52 is supported in a substantially vertical position. The described construction permits the treadle tray to move into the two positions shown in FIGURE 2 and results in it being resiliently biased in an upward direction.

For locking the treadle tray 36 in the downward position, a locking pin 60 is seated in a well in boss 62 on the bottom of the treadle tray 36. The self-releasing locking pin 60 is outwardly biased by locking pin spring 64 seated between pin boss 66 and the internal end of well 68 in which the locking pin 60 is seated. The locking pin 60 carries a hollow grommet 70 on its end. The treadle 32 is locked in the downward position by hollow grommet 70 being forced by manual action under an outwardly extending boss on the front edge of the bottom of case 10. The locking pin 60 is maintained in the locking position by friction between grommet 70 and the boss on the bottom of the case as the pin 60 is urged outwardly by spring 64. A slight downward movement of treadle 32 permits pin 60 to move outwardly under pressure of spring 64 to unlock the treadle. The device is constructed with a switch, not shown, which is positioned by locking of the treadle to actuate another welding circuit which permits soldering with soldering equipment while the upper and lower electrodes are held apart.

Lower electrode turret 72 is rotatably mounted on lower turret post 52 by an arrangement which will be described hereinafter. Lower turret 72 carries electrodes 74 equally spaced around it. Both the upper turret 28 and the lower turret 72 are of rectangular construction in the preferred modification. Although the electrode turret 72 supports a plurality of electrodes, all of the electrodes are referred to herein by the numeral 74.

As described above, the front wall 20 of the case 10 is mounted at an angle to the bottom 11 to slope rearwardly, the upper electrode post 18 is mounted substantially perpendicular to the front wall 20, and the electrodes 30 are constructed with an angle 31 substantially equal to the angle between the front wall 20 and the bottom 11. Thus the electrode posts are mounted at an angle of less than 90° to each other. The angle between face 20 and bottom 11, and thus angle 31, is preferably about 20°. The construction permits the operator to view at an angle the contact points of the electrodes in vertical orientation, and the work being welded. In other words, the contact points and the work between them can be viewed at an angle rather than by looking at them vertically with the view being obstructed by post 18 and other structure.

Reference will now be made to FIGURES 4–7 for a detailed description of the arrangement for mounting the electrode turrets in their respective turret posts and the means by which indexed positions are defined for the turrets and by which they are moved to these indexed positions by snap action. The construction of the lower and upper electrode posts and corresponding turrets are identical so that the construction of only one will be described, this being the lower turret post and turret construction.

The electrodes 74 are mounted in electrode channels 75 in electrode turret 72 by means of set screws, not shown, which fit into channels 76. The turret 72 is mounted in turret post 52 by means of turret stud 78 which fits in circular turret stud hole 80 extending axially into turret post 52. The turret stud 78 in this preferred modification is constructed with a rectangular central section between round end portions, and in this modification the central section is substantially square. The turret stud 78 is seated in cam seat element 82 as shown in FIGURE 5. Cam seat element 82 is radially mounted in cam seat element hole 84 in turret post 52 a short distance from the top. The cam seat element 82 is a stud-like element in which is formed camming seat 85. The camming seat is formed by inner end 86, outer end 88 and bottom 90. The camming surface 92 extends at an angle of approximately 45° between bottom 90 and the internal surface of outer end 88.

The cam seat element 82 is provided with a threaded stud 94 extending radially outside of turret post 52. The threaded stud 94 is attached to the camming section of cam seat element 82 and is provided with adjustment nut 96 on its outer threaded end. A cam seat element biasing spring 98 is seated between a spring seat 100 in the internal surface of adjustment nut 96 and the outer adjacent surface washer 97 seated against turret post 52.

It will be seen that the described arrangement biases the cam seat element in the direction of turret stud 78 so that the internal surface of ouer end 88 and the camming surface 92 are resiliently biased against turret stud 78. In this arrangement the vertical edges of rectangular shaped turret stud 78 become camming elements against the camming surface 92. It will be seen that the construction positions the camming stud in four defined positions and that rotational pressure on turret stud 78 through its turret 72 will cause the turret stud to move to these positions by a snap action, and the stud will remain fixed in each of these various positions. The turret stud 78 is mounted with respect to turret 72 so that the corresponding pairs of camming edges 102 of the stud are in substantially the same vertical plane as corresponding pairs of electrodes 74. The turret stud 78 is constructed with round portions 103 at its ends.

As shown in FIGURE 6, at least one of the electrodes 74 is resiliently mounted on turret post 52 by means of electrode trunnion 104 which is pivotally attached to electrode boss 106 by means of electrode hinged pin 108. Electrode biasing spring 110 is seated between the bottom surface of trunnion 104 and the upper surface of boss 106. The purpose of this arrangement is to provide light spring tension on the work for electric soldering, for example, without the necessity of an adjustment means to adjust the normal tension of spring 44 for lighter tension work. In other words, biasing spring 110 provides light tensioning pressure beyond the point where spring 44 is effective because the treadle has reached its stop position.

From the above construction it is seen that when rotational force is applied to the electrodes of both turrets, the turrets will move into definite positions by snap action. This eliminates the necessity of hand adjustment and insures that corresponding pairs of mating electrodes will be accurately positioned in welding relationship. In operation, it is only necessary to adjust the lower and upper electrodes to their required defined positions and then keep the treadle locked down while the work piece is placed in position. The treadle can then be released and operated to provide for spot welding of the workpieces supported between the corresponding electrode points. The treadle 32 is also resiliently mounted so that this insures that all of the corresponding electrodes contact each other and the work piece between them in a resilient rather than a rigid manner. In case greater resiliency is required, the electrode arrangement of FIGURE 6 can be used so that an augmented resiliency results; that is, that provided by spring 110 and spring 44.

Reference will now be made to FIGURES 6 and 7 for a description of another modification of the invention in which a different construction is provided for positioning the turrets and causing them to move into defined positions by snap action.

In this modification, a threaded shank 112 is secured in turret post 52 by a set screw 114 or other convenient means. The shank 112 is provided with external threads on its outer end by means of which an internally threaded adjustment nut 115 is attached thereto. A camming grommet 116 provided with rear foot 118 and two front feet 120 is mounted on shank 112 by means of a shank hole 122 in its center. This grommet may be made of plastic or metal. A grommet biasing spring 124 is seated between an internal seat in adjustment nut 115 and the external surface of camming grommet 116. In this construction, the front feet 120 of camming grommet 116 provide a camming surface for the edges or corners of rectangular shaped turret 72 providing for four definite positions of the turret 72 and causing it to move into each of these positions by snap action.

It will be seen from the above description that a welding device has been provided in which corresponding pairs of electrodes have definite welding positions into which they can be moved by snap action, thus insuring that they are held firmly in welding position. Furthermore, the arrangement leaves the hands of the operator free to manipulate the work pieces which are being welded. The spring-biased treadle provides for resilient contact between the electrodes or for resilient contact of the electrode contact points with the work piece. Added resiliency can be obtained by use of the individually spring-biased electrode shown in FIGURE 6.

Although the invention has been described with a certain degree of particularity, it is understood that the present disclosure has been made only by way of example and that numerous changes in the details of construction may be resorted to without departing from the spirit and scope of the invention as hereinafter claimed.

What is claimed is:

1. A welding device comprising: at least a pair of electrodes; means for supporting at least one of said electrodes in welding contact position with respect to another electrode; snap action means for at least one of said electrodes for positioning it in said welding contact position, said supporting means comprising a turret post and an electrode turret rotatably mounted thereon by means of a mounting stud; and said snap action means comprises a cam seat element mounted in said turret post and provided with a cam seat with a camming surface and includes said mounting stud seated in the camming seat, and biasing means for resiliently biasing said mounting stud and camming surface into contact with each other.

2. The welding device of claim 1 in which said biasing means includes a spring mounted on a stud of said camming element extending outside said turret post, and between said turret post and an adjustment nut on the end of said stud.

3. The device of claim 1 in which said supporting means comprises a turret post and a rectangular-shaped electrode turret rotatably mounted thereon; and said snap action means comprises a threaded stud mounted radially in said turret post having an adjustment element on its end; a camming grommet mounted on said threaded stud with a camming surface cooperating in camming relationship with the flat surfaces of said turret post; and a resilient element mounted on said threaded stud between said camming grommet and said adjustment element.

4. A welding device comprising: a support means; a first turret post mounted on said support means; a first turret carrying at least one electrode mounted on the end of said first turret post for rotation in a substantially vertical plane; a second turret post mounted on said support means at an angle to said first turret post; a second turret carrying at least one electrode mounted on the end of said second turret post to rotate in a substantially horizontal plane; said turret posts being positioned so that their respective corresponding electrodes are brought into indexed welding contact position by rotation of said turrets; said turrets being positioned into their various indexed positions by snap action means; a turret stud for each of said turrets of rectangular cross-section extending axially into its respective turret post and rotatably supported therein; a cam seat element for each of said turret posts extending radially therein and having a cam seat inside the turret post with a camming surface, said turret stud being seated in said cam seat; and means for resiliently biasing said camming surface and said turret stud into contact with each other with the vertically extending edges of said turret stud serving as camming elements.

5. The device of claim 4 including a threaded stud extending from said camming seat to the exterior of said turret post; an adjustment nut attached to the end of said threaded stud; and a resilient element seated between said adjustment nut and the adjacent surface of said turret post.

6. The device of claim 5 in which said turret stud is attached to said turret with opposed pairs of vertically extending camming edges or elements in substantially the same vertical plane as corresponding electrodes.

7. The device of claim 4 in which said cam seat is comprised of a bottom, two opposed ends and said camming surface connecting said bottom and one of said ends at an angle.

8. A welding device comprising: a support means; a first turret post mounted on said support means; a first turret carrying at least one electrode mounted on the end of said first turret post for rotation in a substantially vertical plane; a treadle mounted on said support means resiliently biased in the direction of said first turret post; a second turret post mounted on said treadle at an angle to said first turret post; a second turret carrying at least one electrode mounted on the end of said second turret post to rotate in a substantially horizontal plane; said turret posts being positioned so that their respective corresponding electrodes are brought into indexed welding contact position by rotation of said turrets; a turret stud for each of said turrets of rectangular cross-section extending axially into its respective turret post and rotatably supported therein; a cam seat element for each of said turret posts extending radially therein and having a cam seat inside the turret post, said turret stud being seated in said cam seat; said cam seat comprising a bottom, two opposed ends and a camming surface connecting said bottom and one of said ends at an angle; a threaded stud extending from said camming seat to the exterior of said turret post; an adjustment nut attached to the end of said threaded stud; a resilient element seated between said adjustment nut and the adjacent surface of said turret post; and means for resiliently biasing said camming surface and said turret stud into contact with each other with the vertically extending edges of said turret stud serving as camming elements.

9. The device of claim 8 in which at least one of said electrodes is spring biased toward said welding contact position by a first biasing means constructed to reach a stop position.

10. The device of claim 8 in which said turret stud is attached to said turret with opposed pairs of vertically extending camming edges or elements in substantially the same vertical plane as corresponding electrodes.

11. In a rotatable electrode holder in which a first element is rotatably supported on a second element by means of a rectangularly shaped support stud extending axially into said second element and said first element must be positioned in various indexed positions with respect to said second element, means for positioning said first element into its indexed positions by snap action comprising: a cam seat element including a threaded stud and a cam seat mounted radially in said second element, said cam seat having a bottom, two opposed ends and a camming surface connecting said bottom and one of said ends at an angle; said support stud being seated in said cam seat; an adjusting element on the end of said threaded stud; and a resilient element seated between said adjustment element and the adjacent surface of said second element resiliently biasing said camming surface and said support stud into contact with each other.

12. In a rotatable electrode holder in which a rectangular shaped first element is rotatably supported on a second element and said first element must be positioned in various indexed positions with respect to said second element, means for positioning said first element into its indexed positions by snap action comprising: a threaded stud mounted radially in said second element having an adjustment element on its end; a camming grommet mounted on said threaded stud with a camming surface cooperating in camming relationship with the flat surface of said first element; and a resilient element mounted on said threaded stud between said camming grommet and said adjustment element biasing said camming grommet into contact with the adjacent flat surface of said first element.

13. The welding device of claim 8 in which said turret posts are mounted at an angle of less than 90° to each other.

14. The device of claim 9 in which at least one of said electrodes is provided with second biasing means becoming effective after said first biasing means has reached its stop position.

15. A welding device comprising: a support means; a first turret post mounted on said support means; a first turret carrying at least one electrode mounted on the end of said turret post for rotation in a substantially vertical plane; a second turret post mounted on said support means at an angle to said first turret post; a second turret carrying at least one electrode mounted on the end of said second turret post to rotate in a substantially horizontal plane; said turret posts being positioned so that their respective corresponding electrodes are brought into indexed welding contact position by rotation of said turrets; said turrets being positioned into their various indexed positions by snap action means; at least one of said turrets being rectangularly shaped and said snap action means comprising a threaded stud mounted radially in said turret post having an adjustment element on its end; a camming grommet mounted on said threaded stud with a camming surface cooperating in camming relationship with the flat surfaces of said turret post; and a resilient element mounted on said threaded stud between said camming grommet and said adjustment element.

References Cited

UNITED STATES PATENTS

| 2,438,262 | 3/1948 | Watkin | 219—86 |
| 2,319,385 | 5/1943 | Calvert | 219—86 |
| 2,438,262 | 3/1948 | Watkin | 219—86 |

RICHARD M. WOOD, *Primary Examiner.*

B. A. STEIN, *Assistant Examiner.*

U.S. Cl. X.R.

219—119